Patented June 5, 1951

UNITED STATES PATENT OFFICE 2,555,464

FLAVORING COMPOSITIONS AND METHOD OF MAKING SAME

Herman H. Bogin and Rufus D. Feick, Detroit, Mich., assignors to Parke, Davis & Company, Detroit, Mich., a corporation of Michigan No Drawing. Application May 5, 1949, Serial No. 91,642

4 Claims. (Cl. 99—140)

This invention relates to the preparation of comminuted solid products in a form capable of maintaining the original physical and chemical characteristics without deterioration for extended periods of time under normal conditions of storage and marketing. More particularly, the invention is concerned with the preparation of stable, water-soluble, non-hygroscopic powders containing one or more normally liquid, volatile, unstable flavoring ingredients.

The ordinary natural and synthetic flavors such as are well-known to the trade are liquids which are highly volatile, extremely sensitive to oxidation by atmospheric oxygen and consist of various combinations of essential oils, alcohols, aldehydes, ketones and esters. Due to the aforementioned volatility many of these extracts lose some of their original flavor or odor or both upon storage. The liquid nature of these flavoring materials makes it very difficult to combine them with solids such as gelatin in the preparation of puddings and tooth powders in the preparation of flavored tooth powders.

In the present state of the art, attempts have been made to eliminate the disadvantages inherent in liquid flavoring materials by packaging materials containing the same in air tight containers. This method of packaging suffers from many disadvantages such as the high cost of the containers, the care with which they must be sealed, leakage and uncertain period of protection. Moreover, while tight packaging may suffice to carry the goods from the manufacturer to the retailer in relatively good condition the flavoring constituent of the goods becomes, in many instances, impaired before sale to the consumer. After the consumer opens the package the flavoring material quickly dissipates, leaving the consumer with a tasteless, unflavored material and a poor impression of the manufacturer's product.

In case of gelatin desserts, puddings and the like a great deal of difficulty has been experienced in trying to incorporate and retain the flavoring materials. At the present time the flavoring material is mixed with a small amount of the gelatin in water and the mixture dried to obtain flavored granules of gelatin or else the flavoring material is placed in a soft-shell gelatin capsule. These granules or capsules are then placed with the remaining ingredients in a heavy waxed bag and the bag sealed insofar as possible against leakage. Even these precautions fail to hold the flavoring material under normal storage conditions and in many instances the aldehydic nature of the flavoring material renders the gelatin with which it is in contact insoluble in water by what is commonly termed "tanning."

A similar problem arises in the case of the flavored powders used in the preparation of cooling beverages in the home. Such powders which commonly consist of sugar and a flavoring material quickly lose their flavor after packaging with the result that the consumer obtains a drink which has the desired color but is lacking in flavor.

We have discovered a means whereby normally liquid flavoring materials may be prepared in a solid, stable form resistant to deterioration either chemically or physically. Our invention consists in incorporating with the normally liquid flavoring material polyvinyl alcohol or other equivalent polyvinyl alcohol derivative and comminuting the mixture into powder form. The polyvinyl alcohol in intimate mixture with the normally liquid flavoring material serves to protect it from oxidative deterioration and in some unknown manner renders it non-volatile under normal conditions of storage and marketing.

We have found that polyvinyl alcohol may be used as a protective ingredient for all the known liquid flavoring materials to obtain free-flowing, water-soluble, stable powders which can be incorporated into packaged goods to impart flavor thereto. The packaged goods containing the new solid flavoring products of the invention do not, insofar as we have been able to determine, lose their flavor or deteriorate in this respect under normal conditions of storage and use and even under more drastic conditions such as standing unpackaged in contact with the atmosphere for extended periods of time. Some of the packaged goods in which these new flavoring products may be used are gelatin desserts, starch puddings, tooth powders, beverage powders, ice creams and the like. Due to their solid nature, the water-soluble flavoring powders of the invention can be measured more readily than the ordinary liquid extracts and liquid flavorings used in the home for flavoring pastries, cakes, icings and the like. The stability of the instant products against loss of flavor is particularly valuable in this respect since large amounts of flavoring materials are not required for home use and consequently an opened package thereof must retain its strength for as long as several years.

As representative of the many liquid flavoring materials which can be used in the practice of the invention are imitation raspberry, imitation cherry, imitation peach, imitation pineapple, imitation almond, imitation peppermint, imitation loganberry, imitation strawberry, oil of orange, oil of lemon, imitation rum, imitation wintergreen, imitation lemon, imitation vanilla, vanilla extract, oil of lime and the like.

In preparing the products of the invention the polyvinyl alcohol and the liquid flavoring material to be stabilized are both incorporated into a liquid vehicle such as water to form a homogeneous mixture, preferably a solution, and the liquid vehicle evaporated off at a low temperature thereby obtaining a solid product which is then comminuted into powder form. The amount of polyvinyl alcohol to be used with a particular material depends somewhat upon the volatility of the flavoring material and upon whether it is an oil flavoring or a water-soluble one. In general, satisfactory solid products may be obtained with as little as 10% by weight to as high as several hundred per cent by weight but usually the polyvinyl alcohol is between about 40-60% by weight. Due to the non-toxic and bland nature of the polyvinyl alcohol, its permissible upper limit in the compositions of the invention is limited solely by economic consideration while the lower limit of 10% by weight appears to be about the minimal amount of polyvinyl alcohol necessary to provide protection of the flavoring material and provide a satisfactory solid product. Generally speaking, however, larger amounts of the polyvinyl alcohol are required with the oily flavoring materials than with the water-soluble flavoring substances.

The following examples are illustrative.

Example 1

1 fluid oz. of U. S. P. oil of orange is mixed with 1 fluid oz. of U. S. P. alcohol. This mixture is added slowly with vigorous agitation to 0.9 oz. of polyvinyl alcohol dissolved in 8.1 oz. of water. The emulsified mixture is frozen at −40° C. and then the water removed in the form of ice by sublimation near the melting point under a pressure of 2-3 mm. When sublimation is complete, about forty-eight hours, the solid so obtained is milled to a free-flowing granulation. This solid product upon the addition of water readily yields the oil of orange and may be left in contact with air for long periods of time without noticeable loss of the orange flavor. It is non-hygroscopic and does not lump or cake even in contact with moisture-laden air. One example of the many uses to which this product may be put is in the preparation of gelatin desserts as described below.

The solid product containing U. S. P. oil of orange prepared above is mixed with one package of commercially available unflavored gelatin dessert. The resulting mixture is an orange-flavored gelatin dessert which may be packaged in the usual manner and when so packaged retains its flavor under normal conditions of storage for long periods of time. To prepare the dessert for the table the contents of the package are dissolved in hot water and then the solution allowed to cool and gel in a refrigerator or other cool place. The polyvinyl alcohol used to preserve the orange flavoring material does not interfere with the setting properties of the gelatin.

The orange-flavored solid prepared by the above described method can also be mixed with granulated sugar containing an orange dye to produce a very satisfactory orange drink upon mixing with water. The beverage powder is very stable and retains its flavor under normal conditions of storage.

Example 2

1 fluid oz. of U. S. P. oil of orange is warmed to 50° C. and added slowly with vigorous agitation to 50 g. of polyvinyl alcohol dissolved in 150 g. of water. The resulting emulsion which is more stable than that obtained in Example 1 is frozen at about −40° C. and the water evaporated therefrom in the form of ice under a pressure of about 1-2 mm. The friable solid product thus obtained is milled to a fine free-flowing granulation having the same characteristics as the product described in Example 1. This product, like that of Example 1, may be used in the preparation of gelatin desserts, beverage powders and ice creams.

If desired, oil of lemon or oil of lime may be substituted for the oil of orange used in the above example. If desired, a mixture of oil of lemon and oil of lime may also be used in which case a lemon-lime flavored solid is obtained. This solid is of particular utility in the preparation of beverage powders.

Example 3

0.5 fluid oz. of imitation loganberry flavor is added with vigorous stirirng to a solution of 0.5 oz. of polyvinyl alcohol in 4.5 fluid oz. of hot water. The resulting solution is cooled, frozen and the water sublimed in the form of ice therefrom under reduced pressure, that is, at about 1-2 mm. The solid product thus obtained is friable and is easily milled to a free-flowing granulation. It is water-soluble but non-hygroscopic. Insofar as we have been able to ascertain, it retains its flavor and odor for long periods of time without detectable loss. This solid flavoring material can be used in the preparation of gelatin desserts, ice creams and beverage powders.

By following the same procedure and using 0.5 fluid oz. of imitation raspberry flavor, one obtains a raspberry-flavored solid having the same characteristics as the solid loganberry-flavoring material described above. One of the many imitation raspberry flavors which can be used for this purpose has the following formula [excluding the dye]:

|  | Parts |
| --- | --- |
| Isobutyl acetate | 425 |
| Isoamyl acetate | 275 |
| Ethyl acetate | 200 |
| Ethyl formate | 35 |
| Benzyl benzoate | 20 |
| Bromelia | 15 |
| Vanillin | 10 |
| Linaloöl | 10 |
| Eugenol | 6 |
| Benzyl acetate | 2 |
| Geraniol | 1 |
| Ionone | 1 |
| Total | 1000 |

Imitation peach flavor, 0.5 fluid oz., may also be substituted for the loganberry flavoring used in the above preparation. An example of such peach flavorings is one having the following composition [excluding the dye]:

|  | Parts |
| --- | --- |
| Cyclohexyl butyrate | 600 |
| Ethyl cinnamate | 140 |
| Benzyl butyrate | 140 |
| Isoamyl butyrate | 70 |
| Isobutyl salicylate | 20 |
| γ-Undecalactone | 20 |
| Geranyl formate | 10 |
| Total | 1000 |

Imitation pineapple, strawberry and cherry solid flavoring materials can be obtained by substitution of the corresponding imitation flavoring material for the loganberry flavor used in the above procedure.

*Example 4*

3 oz. of polyvinyl alcohol is dissolved in 30 oz. of water and then 3 oz. of methyl anthranilate [synthetic grape flavoring] added with rapid stirring. The mixture is frozen at about −40° C., the water in the form of ice sublimed therefrom under pressure of 1–2 mm. and the dry solid milled to a fine powder. The solid grape flavoring material thus obtained is stable and does not lose its flavor or deteriorate upon prolonged standing. It is a fine non-hygroscopic powder which flows freely even in a moist atmosphere. One of the many possible uses of this product is in the preparation of a grape-flavored beverage powder. This is accomplished as follows:

The finely granulated grape flavor powder prepared as described above is mixed with 1¼ lbs. of finely powdered tartaric acid, 1 oz. of finely powdered potassium hydrogen tartrate and 5 lbs. of finely granulated sugar. Sufficient synthetic grape color is sprayed onto the mass to give the desired shade when one tablespoon is mixed with one gallon of water. The dry product thus obtained is readily soluble in water and does not deteriorate noticeably upon storage.

The above examples are representative of the stable, solid flavoring products which may be obtained in accordance with this invention and which include flavoring substances which are normally liquid, volatile and susceptible to oxidation.

Our invention in its broader aspects consists in a stable, readily milled, solid flavoring product containing as one of its ingredients a normally liquid, volatile and unstable flavoring material. The ingredient which imparts these desirable properties to such liquid flavoring materials is preferably polyvinyl alcohol but other equivalent polyvinyl alcohol derivatives may also be used in lieu thereof. It should also be understood that, if desired, sugars, dyes and fruit acids, etc. can be incorporated into the products of the invention without departing from the scope or spirit thereof.

What we claim as our invention is:

1. A solid flavoring product comprising an intimate mixture of a normally liquid, volatile and unstable flavoring material and polyvinyl alcohol.

2. A stable, solid product comprising a dried solution of a normally liquid, volatile and unstable flavoring material and polyvinyl alcohol, said dried solution being substantially free from the solvent and being in comminuted form.

3. A solid flavoring product comprising a normally liquid, volatile and unstable flavoring material and at least 10% by weight of polyvinyl alcohol.

4. The method of stabilizing a normally liquid, volatile and unstable flavoring material against volatilization and oxidative deterioration which comprises placing said liquid material together with polyvinyl alcohol in an aqueous solvent medium, removing substantially all of the solvent medium therefrom to obtain a solid mixture and comminuting to powder form.

HERMAN H. BOGIN.
RUFUS D. FEICK.

REFERENCES CITED

The following references are of record in the file of this patent:

UNITED STATES PATENTS

| Number | Name | Date |
|---|---|---|
| 2,088,622 | Stokes et al. | Aug. 3, 1937 |
| 2,217,711 | Shappirio | Oct. 15, 1940 |